US009524752B2

(12) United States Patent
Rav-Acha et al.

(10) Patent No.: US 9,524,752 B2
(45) Date of Patent: Dec. 20, 2016

(54) METHOD AND SYSTEM FOR AUTOMATIC B-ROLL VIDEO PRODUCTION

(71) Applicant: MAGISTO LTD., Nes-Ziona (IL)

(72) Inventors: Alexander Rav-Acha, Rehovot (IL); Oren Boiman, Sunnyvale, CA (US)

(73) Assignee: MAGISTO LTD., Nes-Ziona (IL)

( * ) Notice: Subject to any disclaimer, the term of this patent is extended or adjusted under 35 U.S.C. 154(b) by 0 days.

(21) Appl. No.: 14/994,219

(22) Filed: Jan. 13, 2016

(65) Prior Publication Data

US 2016/0210999 A1 Jul. 21, 2016

Related U.S. Application Data

(60) Provisional application No. 62/103,588, filed on Jan. 15, 2015.

(51) Int. Cl.
*H04N 5/93* (2006.01)
*G11B 27/031* (2006.01)

(52) U.S. Cl.
CPC .................... *G11B 27/031* (2013.01)

(58) Field of Classification Search
CPC .................................................. G11B 27/031

USPC ............. 386/285, 281, 278, 287, 241, 201, 337,386/338
See application file for complete search history.

(56) References Cited

U.S. PATENT DOCUMENTS

| 4,598,269 A | * | 7/1986 | Penney | ............... G06J 1/00 341/118 |
| 5,638,133 A | * | 6/1997 | Squier | ............... G11B 27/031 348/578 |

* cited by examiner

*Primary Examiner* — Robert Chevalier
(74) *Attorney, Agent, or Firm* — Pearl Cohen Zedek Latzer Baratz LLP

(57) ABSTRACT

A method and a system for automatic B-roll editing of video production are provided herein. The method may include: obtaining a plurality of media entities comprising at least one video entity having a visual channel and an audio channel; analyzing the media entities, to produce content-related data indicative of a content of the media entities; automatically selecting at least a first and a second visual portion and an audio portion, wherein the first visual and the audio portions are synchronized and have non-identical durations, and wherein the second visual and the audio portions are non-synchronized; and creating a video production by combining the automatically selected visual portions and audio portions.

16 Claims, 7 Drawing Sheets

METHOD AND SYSTEM FOR AUTOMATIC B-ROLL VIDEO PRODUCTION

CROSS-REFERENCE TO RELATED APPLICATIONS

This Application claims priority from U.S. Provisional Patent Application No. 62/103,588, filed on Jan. 15, 2015, which is incorporated herein by reference in its entirety.

FIELD OF THE INVENTION

The present invention relates generally to the field of video editing, and more particularly to automatic selection of video and audio portions and generating a video production from them.

BACKGROUND OF THE INVENTION

Prior to the background of the invention being described, it may be helpful to set forth definitions of certain terms that will be used hereinafter.

The term 'cutaway shot', or simply 'cutaway' as used herein is the interruption of a continuously filmed action by inserting a view of something else. It is usually, although not always, followed by a cut back to the first shot.

The term 'B-roll', sometimes referred to as 'B roll' or 'Broll' as used herein is supplemental or alternative footage intercut with the main shot which is referred to as the 'A-roll' since it is captured by the so-called 'A camera'. B-roll is a well-known technique used in both film and television industry. In fiction film, B-roll is used to indicate simultaneous action or flashbacks. It documentary films, B-roll is used in interviews, monologs, and usually with an accompanied voiceover, since B-rolls usually do not have their own audio.

The term 'video production' used herein is the process of creating video by capturing moving images (videography), and creating combinations and reductions of parts of this video in live production and post-production (video editing). In most cases, the captured video will be recorded on electronic media such as video tape, hard disk, or solid state storage, but it might only be distributed electronically without being recorded. It is the equivalent of filmmaking, but with images recorded electronically instead of film stock.

In video editing, the technique of using a cutaway is common to hide zooms, where the visuals may cut away to B-roll footage of what the person is talking about while the A camera zooms in, then cut back after the zoom is complete.

The cutaway to B-roll footage can also be used to hide verbal or physical tics that the editor and/or director finds distracting: Because the audio is separate from the video, the speaker's voice is heard as a voice-over while B-roll footage is shown. The filmmakers are thus free to excise sniffs, coughs, and so forth without the video showing the small skips associated with these minor excisions. Similarly, a contextually irrelevant part of a sentence or anecdote can be removed to construct a more effective, succinct delivery. In many cases, these latter excisions are legitimate edits used to make a film more pleasing and coherent.

As may be apparent from the aforementioned discussion, manually generating a video productions that involves B-roll is extremely time consuming and requires experience in video production.

It would, therefore, be advantageous to be able to automatically generate video production that includes this feature.

SUMMARY OF THE INVENTION

In accordance with some embodiments of the present invention, an automatic B-roll video production generator is provided herein. The B-roll is used to enrich a relatively long or boring moments of speech by adding intercuts to alternative footage while still playing the speech in the background.

Some embodiments of the present invention provide a method and a system for automatic B-roll editing of video production. The method may include: obtaining a plurality of media entities comprising at least one video entity having a visual channel and an audio channel; analyzing the media entities, to produce content-related data indicative of a content of the media entities; automatically selecting at least a first and a second visual portions and an audio portion, wherein the first visual portion and the audio portion are synchronized and have non-identical durations, and wherein the second visual portion and the audio portion are non-synchronized; and creating a video production by combining the automatically selected visual portions and audio portions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
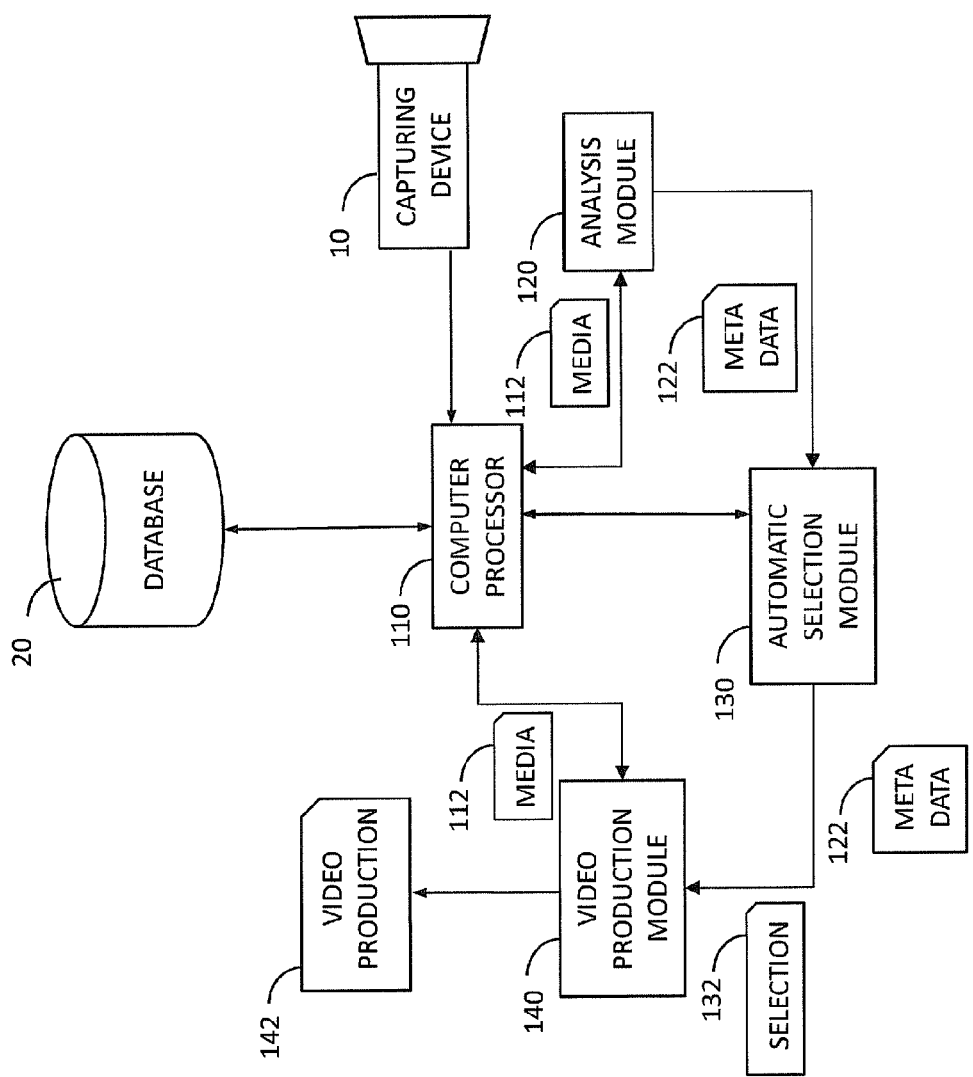
FIG. 1 is a block diagram illustrating a non-limiting exemplary system in accordance with some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Automatic video editing is a process in which a raw footage that includes videos and photos is analyzed, and portions from that footage are selected and produced together to create an edited video. Sometimes, an additional music soundtrack is attached to the input footage, resulting in a music clip that mixes the music and the videos/photos together.

A common flow for automatic video editing (but not the only possible flow) is:

Analyzing the input footage.

Automatic selection of footage portions and decision making.

Adding transitions and effects and rendering the resulting edited video.

The automation selection and decision making stage usually consists of:

Selecting the best portions of the videos and photos.

Determine the ordering of these portions in the edited video.

For each video portion, deciding whether the audio of this video will be played or not (or a more general mix with the soundtrack).

In accordance with some embodiments of the present invention, it is suggested to allow different selections for the audio and video (or visual) channels. Naturally, in most cases these selections will be dependent—for example, in many cases, most of the selected audio channels will be identical to the corresponding video channel, and only some of them will be different.

The simplest example is when the audio channel continues beyond the corresponding selected video portion. During this time, other pieces of footage are shown (known as the 'B-roll'), such as photos or video portions without speech. It should be noted that, whenever the A-roll is shown (The A-roll is the basic video portion from which the audio is taken), the audio channel should be synchronized to it, in order to avoid artifacts such as lips movements that are not synchronized to the talk, and the like. In another example, the audio can start before showing the corresponding video (also known as "inverse B-roll"), or having more general combinations.

FIG. 1 is a block diagram illustrating a non-limiting exemplary system 100 in accordance with some embodiments of the present invention. System 100 may include a computer processor 110 connected to a database unit 20 which may be configured to store a plurality of media entities 112 possibly captured by capturing device 10 and including at least one video entity having a visual channel and an audio channel.

System 100 further includes an analysis module 120 executed by computer processor 110 and configured to analyze media entities 112, to produce content-related meta data 122 indicative of a content of media entities 112. System 100 further includes an automatic selection module 130 executed by computer processor 110 and configured to automatically make a selection 132 of at least a first and a second visual portion and an audio portion, wherein the first visual and the audio portions are synchronized and have non-identical durations, and wherein the second visual and the audio portions are non-synchronized. System 100 further includes a video production module 140 executed by computer processor 110 and configured to create a video production 142 by combining the automatically selected visual portions and audio portions.

It should be noted that the proposed mechanism differs from the special case of a video editing in which several videos that were taken at the same event are synched and mixed together automatically. This special case is common in television shows or performances, where the same event is shot by multiple cameras. In this special case, the selections of audio channel being used may be different from the selection of video channel—however, the audio and visual channels are synchronized (thus, the selection of audio source is mainly based on audio quality considerations). Some embodiments of the present invention are different, since the photos or video portions being shown as B-roll are not synchronized in time to the played audio but can be taken from arbitrary capture times.

Figure 2:
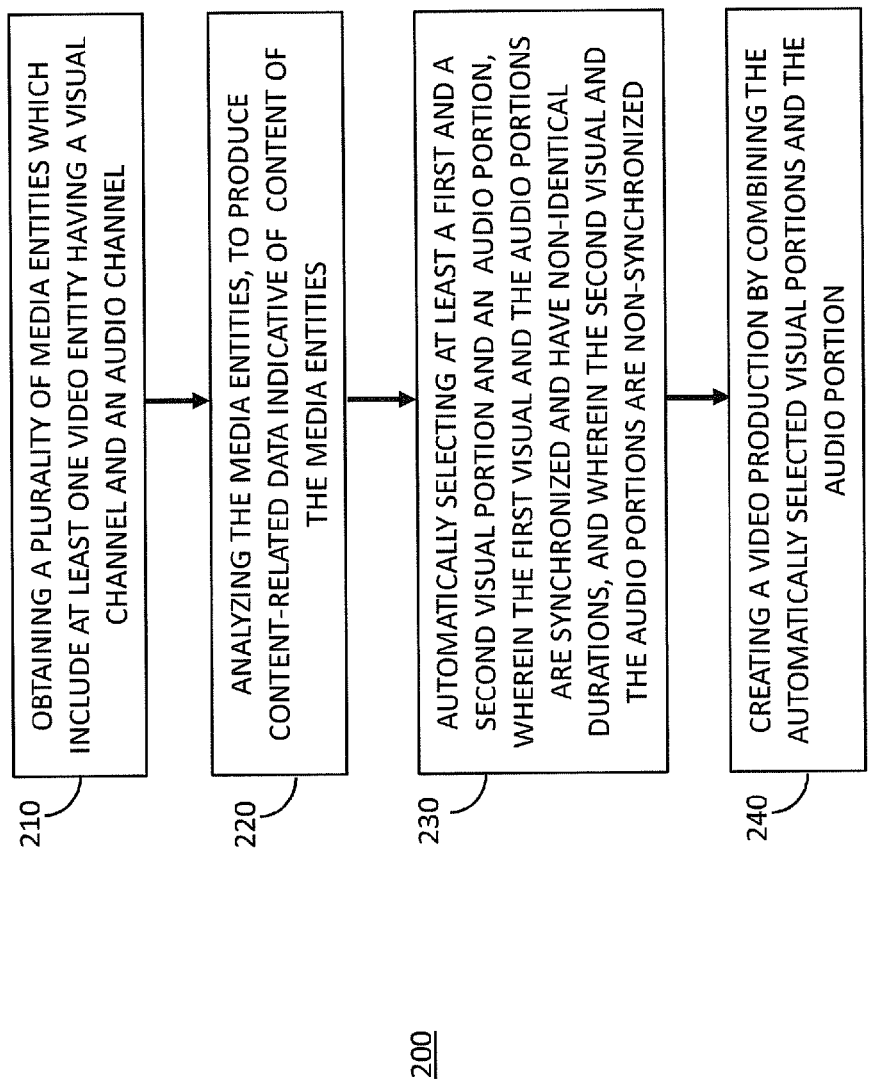
FIG. 2 is a flowchart diagram illustrating a non-limiting exemplary method in accordance with some embodiments of the present invention.

FIG. 2 is a flowchart diagram illustrating a non-limiting exemplary method in accordance with embodiments of the present invention. Method 200 may include the following steps: obtaining a plurality of media entities comprising at least one video entity having a visual channel and an audio channel 210; analyzing the media entities, to produce content-related data indicative of a content of the media entities 220; automatically selecting at least a first and a second visual portion and an audio portion, wherein the first visual and the audio portions are synchronized and have non-identical durations, and wherein the second visual and the audio portions are non-synchronized 230; and creating a video production by combining the automatically selected visual portions and audio portions 240.

In accordance with some embodiments of the present invention, the video production may include two or more B-roll visual portions being a selected visual portion that are non-synchronized with the selected audio portion.

In accordance with some embodiments of the present invention, the video production comprises at least one video cut that is not synched with the corresponding audio cut, wherein the video cut is a transition between two consecutive selected visual portions at the video production, and wherein the audio cut is a transition between two consecutive selected audio portions at the video production.

In accordance with some embodiments of the present invention, the video production may include multiple visual portions per audio portion.

In accordance with some embodiments of the present invention, the visual portions may include at least one video portion.

In accordance with some embodiments of the present invention, at least two B-rolls have a common audio portion where timing of the B-rolls is aligned with content of the common audio portion.

In accordance with some embodiments of the present invention, the automatic selection of specified visual portions depends upon the content of at least one audio portion that corresponds to a source media other than said specified visual portions In accordance with some embodiments of the present invention, the automatic audio selection is based on speech analysis of the audio channel.

In accordance with some embodiments of the present invention, the automatic audio selection is based on speech analysis of the audio channel. In some embodiments, the A-roll may be selected as a portion for which there is a music detected in the audio. For example, someone that is singing or playing music. Alternatively, if the A-roll relates to an audio with music, the timing of the B-rolls can be determined based on a segmentation of the audio into instrumental and vocal portions.

In accordance with some embodiments of the present invention, the automatic audio selection is based on sentences analysis of the audio channel.

In accordance with some embodiments of the present invention, the method may include analyzing the first visual portion to determine time related score indicative of predefined criteria, and determining a timing of the B-rolls based on the score.

In accordance with some embodiments of the present invention, the score comprises saliency of a scene captured in said first visual portion.

Figure 3:
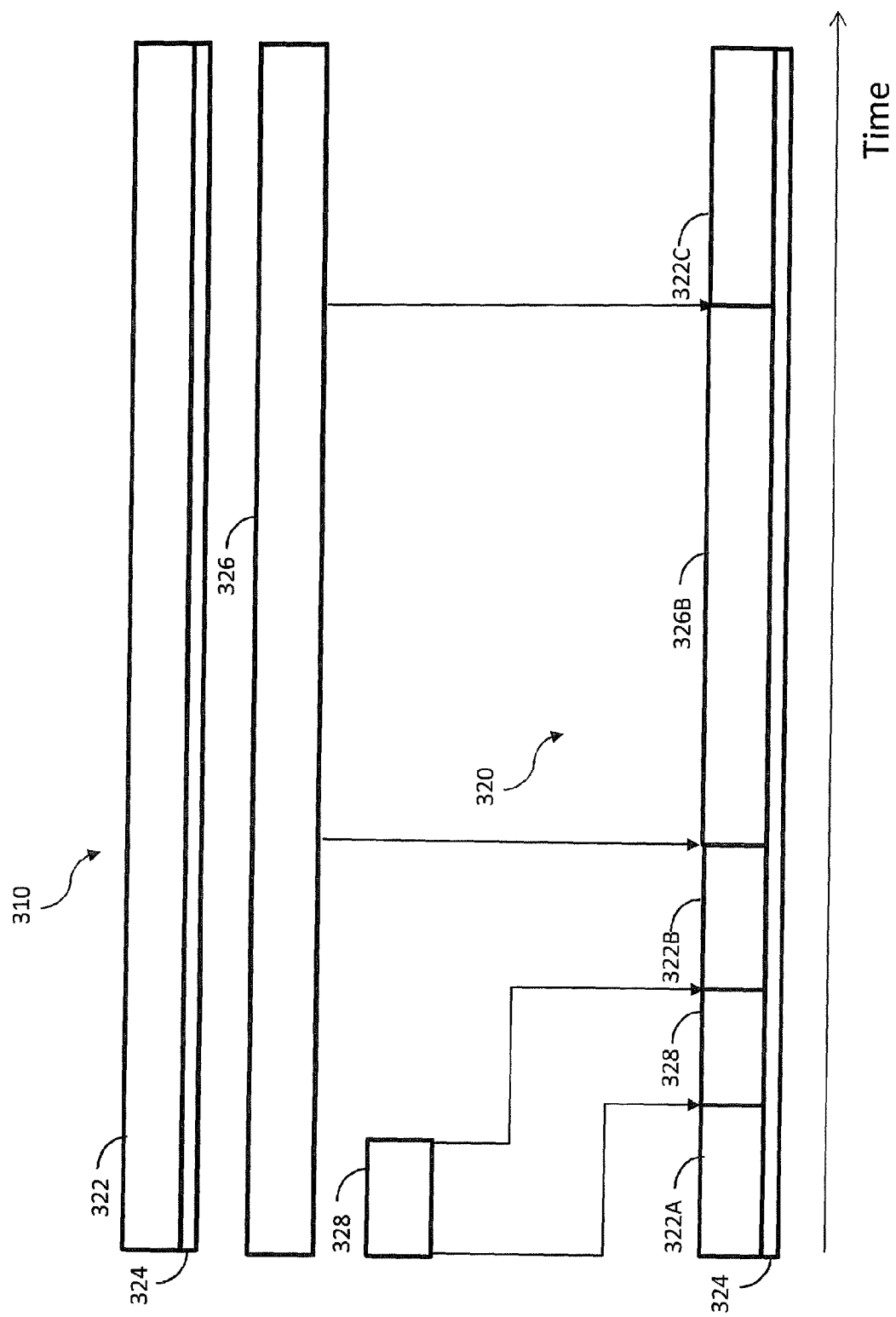
FIG. 3 is a timeline diagram illustrating a non-limiting exemplary aspect in accordance with some embodiments of the present invention.

FIG. 3 is a timeline diagram illustrating input and output of a method in accordance with some embodiments of the present invention. The timeline diagram illustrates a so called full-B-roll mechanism which is a special case of the B-roll mechanism. Input media 310 includes a single continuous A-Roll video 322 with it accompanying audio 324. Additionally, a B-roll video 326 (whose audio is not selected) is also provided together with at least one still image 328. Upon automatic selection and generation of the video production, single continuous audio segment A-Roll video is used for the entire edited video. The output video production 320 may include the entire audio track 324, wherein the visual (video) channel is a mix of selections 322A, 322B, and 322C from video the A-roll and from B-roll 326B as well as still image 328. It is important to note that the selections from the first video 322A, 322B, and 322C are synchronized with the audio 324 selected from the same video 322, so as to avoid mismatch between the visual and audio channels. However, for the B-Roll selection 326B there is no such constraint and it is used with the audio of the A-Roll 324.

Figure 4:
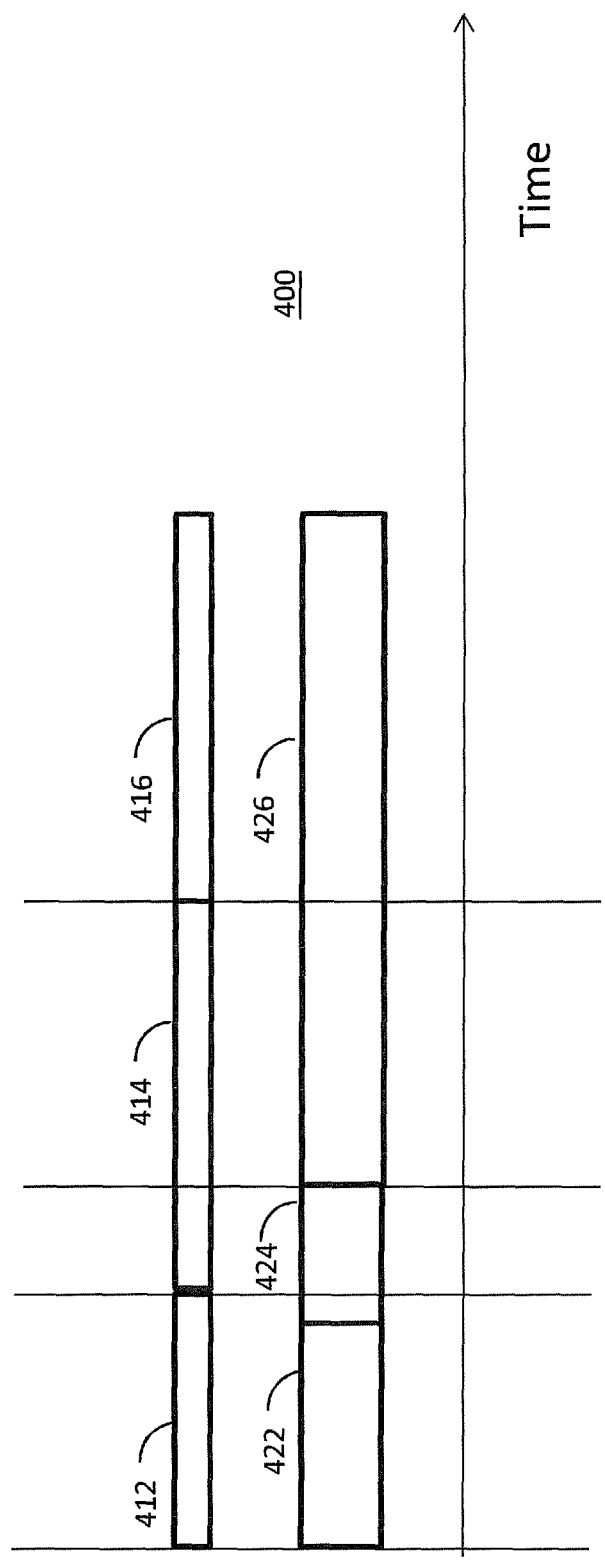
FIG. 4 is a timeline diagram illustrating another non-limiting exemplary aspect in accordance with some embodiments of the present invention.

FIG. 4 is a timeline diagram illustrating another non-limiting exemplary aspect in accordance with some embodiments of the present invention; Timeline 400 describes a layered implementation of the B-roll. In this example, the video production starts with the A-roll video 422 and its accompanying audio 412. Then, the video channel cut to a B-roll 424 although the audio 412 lingers for a while until it is cut to audio 414 which belongs to B-roll video 424. The cuts are carried out to content analysis of the video or the audio so as to automatically locate the optimal cut point for each of the video and the audio channels independently of each other. Similarly, a further cut to a second B-roll 426 is carried out while maintain audio 414 for a while until it is automatically replaced (possibly due to content analysis) with audio 416 which is the corresponding audio of second B-roll video 426 In this implementation, the B-roll effect is achieved via additional visual layer that overrides the first visual layer and each additional video layer have its own audio which is not necessarily cut as the video selections.

Figure 5:
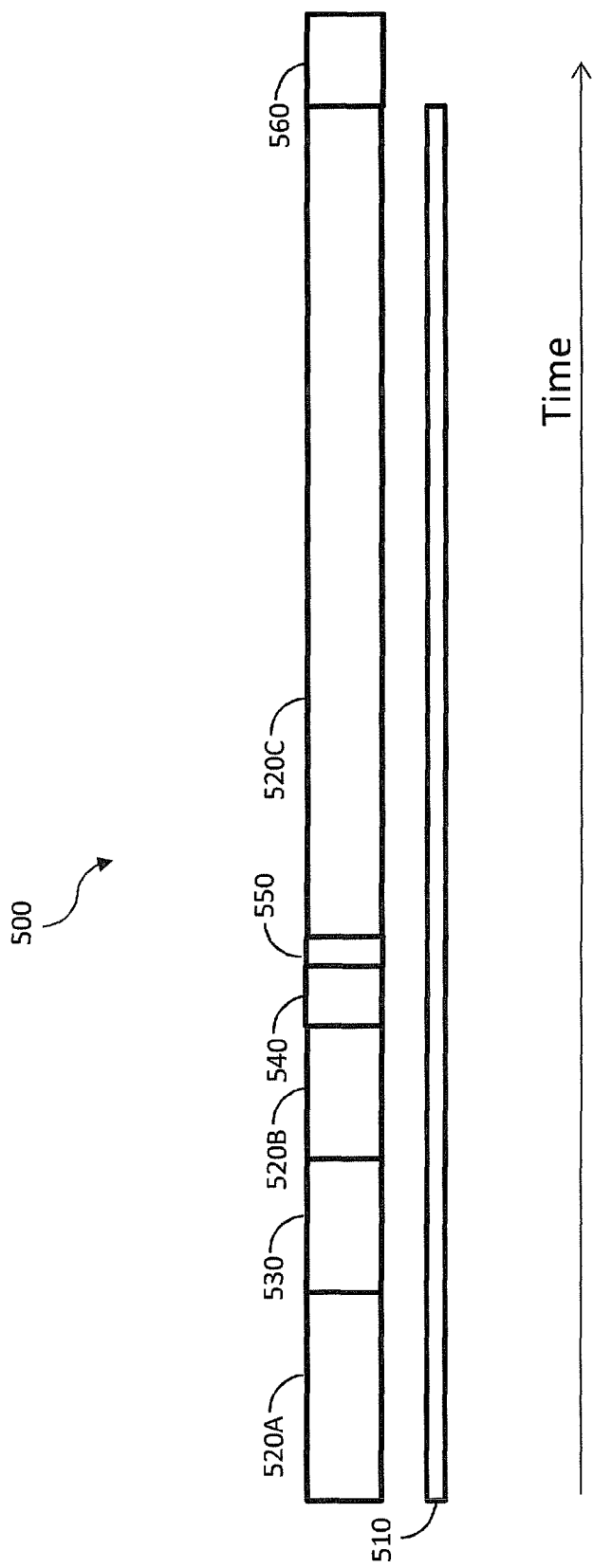
FIG. 5 is a timeline diagram illustrating yet another non-limiting exemplary aspect in accordance with some embodiments of the present invention.

FIG. 5 is a timeline diagram illustrating yet another non-limiting exemplary video production 500 in accordance with some embodiments of the present invention. Video production 500 illustrates selections of an A-roll video 520A, 520B, and 520C having same synched audio 510, wherein the automatic selection provides B-roll video 530, still images 540 and 550 shown in various durations, all with original audio 510 and lastly, image 560 which is automatically selected as an ending cutaway, without any accompanying audio.

Figure 6:
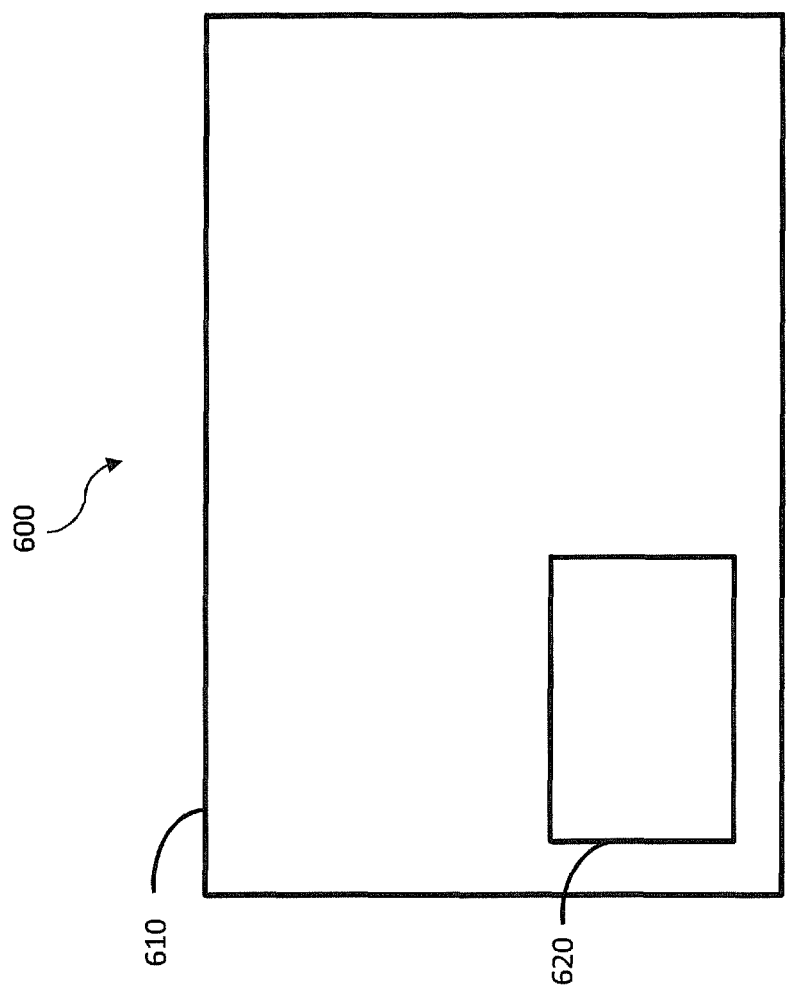
FIG. 6 is a frame diagram illustrating a non-limiting exemplary aspect in accordance with some embodiments of the present invention.

FIG. 6 is a frame diagram illustrating a non-limiting exemplary aspect in accordance with some embodiments of the present invention. Frame 600 illustrates that a cutaway to B-roll can occur in part of the frame and not all of it. Specifically, 610 denotes the part of the frame in which the B-roll is displayed while 620 is the part of the frame where the A-roll video is still presented, commonly scaled down to the respective dimension. Thus, both B-roll and A-roll are presented simultaneously, and the automatic selection is applied to the timing of the start and end time of the B-roll, as well as the layout within the frame of its presentation.

In accordance with some embodiments of the present invention, the automatic selection of the cutaways is content based. A main criterion for a video portion to be used as an A-roll is consisting of a long monolog. The best places to put the B-roll (overriding the A-roll) are moments in which the visual footage is relatively boring (e.g., a talking person that is not moving). These moments can be identified as having a low saliency measure.

The B-roll footage can be selected based on its relevance to the A-roll (e.g., based on scene understanding, topic analysis, speech recognition, and the like). As illustrated above, the B-roll can be either a photo or a video segment for which the corresponding audio is not played in the edited video (or played at a low volume), for example, when the audio is classified as not interesting (for example, because it has no speech).

According to some embodiments of the present invention, the positions in which the B-roll portions are added can also be a function of speech changes over time, for example, start and end of sentences, long pauses, intonation changes, and the like.

In most cases, the B-roll mechanism is used for monolog videos (or other videos having speech). However, another interesting case in when the video consists of someone that is performing in front of the camera. In such cases, the audio channel will consist of the song or of a music.

When the audio consist of music and not of speech, the same B-roll mechanism can be used, but usually no additional soundtrack will be added. Alternatively, the music from the audio channel can be automatically replaced with the original music soundtrack (using music recognition systems such as Shazam™) that has the same "content" but at a higher quality.

According to some embodiments of the present invention, speech recognition and video analysis can be used to understand the topic and add relevant footage (for example, photos that are related to that topic) as a B-roll. Bellow there are described several sources of information and methods for deciding on the B-roll photos (or videos) to be used:

Using speech recognition. For example—detecting the words "trip" and "forest" might yield photos taken from a forest.

Using location information, for example using the GPS: adding photos taken from the same location (e.g., a tourist attraction) or from a scene having similar attributes to this location (for example, park, beach, and the like).

Using the time captures (e.g., day, night).

Using text analysis when a text is available (e.g., when the footage is attached with description or comments). For example, add footage of a birthday if the photos have an attached title of "Happy Birthday Daddy".

Using the topic: the topic may be given by the user (e.g., via title or selection from several options), or it can be derived automatically using various methods from any of the above sources of information, or a combination thereof. An example for a topic may be "Football" or "Messi" or "Wedding", and the like.

Image and Video analysis, identifying, for example, the scene in which the footage was taken or attributes of this scene (e.g., daylight vs. night, beach, home, and the like). The specific location can also be identified, for example, by detecting objects and location in the background (for example, if someone was taking a photo while having the Eiffel Tower at the background).

In accordance with some embodiments of the present invention, a specific designated user interface (UI) for automatic editing with B-roll may be provided herein.

The usage of the B-roll mechanism in automatic video editing (especially in the case of the full B-roll) may be improved by modifying the user interface of the video editing application.

One possible UI component is letting the user record a "monolog" video, in which he (or someone else) is talking to the camera. This video can be used as the A-roll of the resulting edited video, from which the audio will be taken. In addition, the user can choose additional footage-videos and photos to be used as B-roll (or from which the system will automatically choose portions to be used as B-roll).

Figure 7:
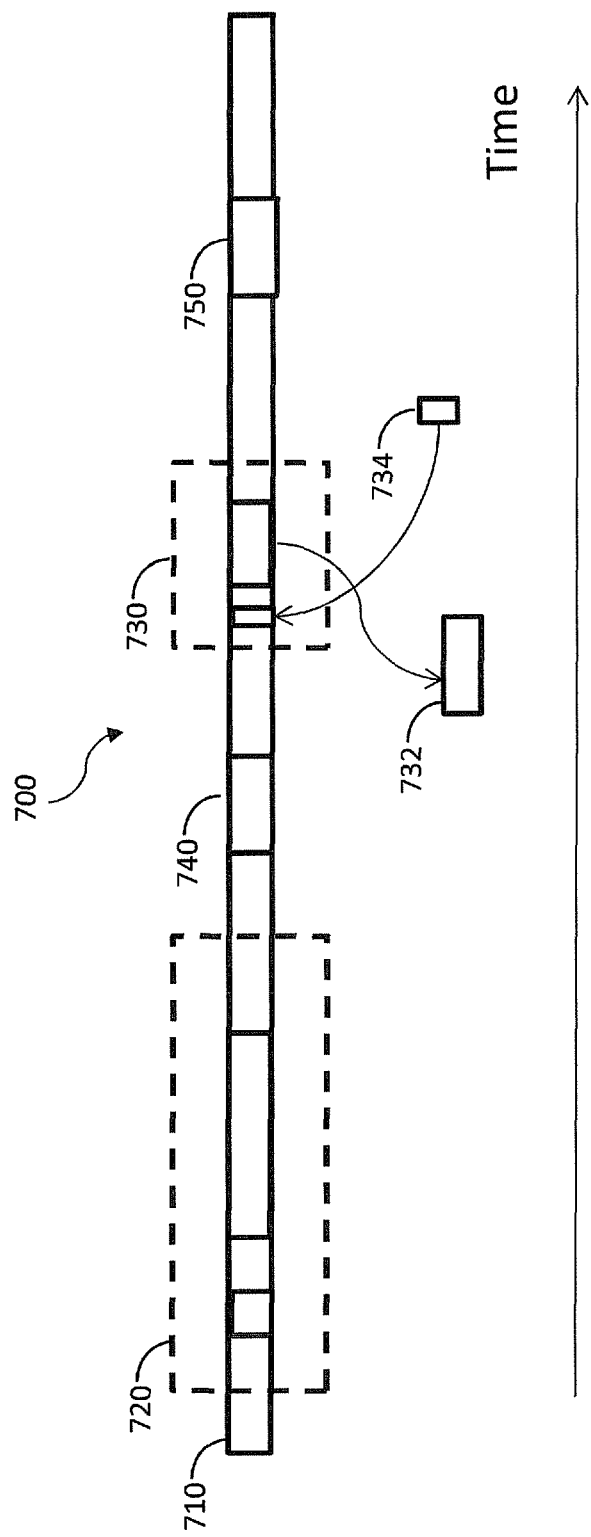
FIG. 7 is a timeline diagram illustrating yet another non-limiting exemplary aspect in accordance with some embodiments of the present invention.

FIG. 7 is a timeline diagram illustrating yet another non-limiting exemplary of a video production 700 in accordance with some embodiments of the present invention. The concept of a generating bundle 720 is introduced by associating one or more of the B-rolls with a respective video portion being the respective A-roll 710 to form a single bundle 720 that can be multiplied and located later on as in 730. Bundle 720 can also be applied with a video production action in its entirety. In other words, a video production action will be applied simultaneously to all the assets of bundle 720. In some embodiments, the action comprises changing a start time of the bundle. Alternatively, the action may include changing a start time of assets within the bundle. Additionally, the user can remove or add assets 732, 734 from bundle 730 or change its internal location along the timeline. It is understood that while using the bundle (which is generated automatically), the editing of the bundle itself may be carried out manually or automatically, and that other B-roll videos such as 740 and 750 may be automatically selected and added, in accordance with other embodiments of the present invention.

Advantageously there are various specific industry verticals that may be beneficial from the B-roll mechanism in the automatic video editing. Some of them are described herein after.

Introduction/Profile videos for dating: In this application, the user can create an edited video that introduces himself or herself by combining a video in which the user talks to the camera or doing something else, while combining photos of himself or herself as a B-roll. B-roll photos may be manually selected by the user, or they can be automatically selected from various places, such as: the profile page, Facebook™, Google™ images, and the like.

Explanatory/Selling videos: Today, many people use videos for various tasks such as explaining how to do something (e.g., build something), or to sell something (e.g., their house). Their self-generated clip may use the automatic B-roll feature of embodiments of the present invention, by showing photos while the speaker is still talking. These photos can be selected manually, or automatically, for example—using speech recognition (matching words to the relevant objects, for example,—table, kitchen, and the like).

Online lecturing: Today, there is a huge amount of online lectures. These lectures can be automatically produced into a video that combined relevant photos into the talk. These photos can be taken, for example, from the slideshow (if available), or automatically selected based on speech recognition, text analysis (from the slideshow, webpage, and the like) or video analysis (e.g.—whenever the lecturer is pointing to some object).

In accordance with some embodiments of the present invention, the aforementioned method may be implemented as a non-transitory computer readable medium which includes a set of instructions, when executed, cause the least one processor to: obtain a plurality of media entities comprising at least one video entity having a visual channel and an audio channel; analyze the media entities, to produce content-related data indicative of a content of the media entities; automatically select at least a first and a second visual portion and an audio portion, wherein the first visual and the audio portions are synchronized and have non-identical durations, and wherein the second visual and the audio portions are non-synchronized; and create a video production by combining the automatically selected visual portions and audio portions.

In order to implement the method according to some embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, some aspects of the present invention may be embodied as a system, method or computer program product. Accordingly, some aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   obtaining a plurality of media entities comprising at least one video entity having a visual channel and an audio channel;
   analyzing the media entities, to produce content-related data indicative of a content of the media entities;
   automatically selecting visual and audio portions, comprising at least a first and a second visual portions and an audio portion, wherein the first visual portion and the audio portion are synchronized and have non-identical durations, and wherein the second visual portion and the audio portion are non-synchronized; and
   creating a video production by combining the automatically selected visual and audio portions.

2. The method according to claim 1, wherein the video production comprises two or more B-roll visual portions, wherein a B-roll is a selected visual portion that is non-synchronized with the selected audio portion.

3. The method according to claim 1, wherein the video production comprises at least one video cut that is not synched with the corresponding audio cut, wherein the video cut is a transition between two consecutive selected visual portions at the video production, and wherein the audio cut is a transition between two consecutive selected audio portions at the video production.

4. The method according to claim 1, wherein the video production comprises multiple visual portions synchronized with a common audio portion.

5. The method according to claim 2, wherein the B-rolls comprise at least one video portion.

6. The method according to claim 2, wherein at least two B-rolls have a common audio portion and where timing of the B-rolls is aligned with content of the common audio portion.

7. The method according to claim 1, wherein the automatic selection of specified visual portions depends upon the content of at least one audio portion that corresponds to a source media other than said specified visual portions.

8. The method according to claim 1, wherein the automatic audio selection is based on one of: speech analysis and music analysis of the audio channel.

9. The method according to claim 1, wherein the automatic audio selection is based on sentences analysis of the audio channel.

10. The method according to claim 2, further comprising analyzing the first visual portion to determine time related score indicative of predefined criteria, and determining a timing of the B-rolls based on the score.

11. The method according to claim 2, further comprising associating one or more of the B-rolls with a respective video portion being its respective A-roll to form a single bundle, and applying a video production action to the bundle in its entirety.

12. The method according to claim 11, wherein the action comprises changing a start or an end time of the bundle.

13. The method according to claim 11, wherein the action comprises changing the location of the bundle relative to other selected portions.

14. The method according to claim 11, further enabling a user to remove or add assets from the bundle.

15. The method according to claim 10, wherein the score comprises saliency of a scene captured in said first visual portion.

16. The method according to claim 2, wherein the B-rolls comprise user-generated content.

* * * * *